United States Patent

[11] 3,585,425

| [72] | Inventor | Harold R. Newell<br>South Newbury, N.H. |
|---|---|---|
| [21] | Appl. No. | 861,255 |
| [22] | Filed | Sept. 25, 1969 |
| [45] | Patented | June 15, 1971 |
| [73] | Assignee | Mesur-Matic Electronics Corporation<br>Warner, N.H. |

[54] MOVING COIL STEP MOTOR
13 Claims, 6 Drawing Figs.

[52] U.S. Cl. .................................................. 310/49,
310/82
[51] Int. Cl. .................................................. H02k 37/00
[50] Field of Search ............................................ 310/46, 49,
82, 27, 80, 154

[56] References Cited
UNITED STATES PATENTS

| Re22,549 | 9/1944 | Plensler.......................... | 310/82 |
|---|---|---|---|
| 2,079,050 | 5/1937 | Stinnes.......................... | 310/82 |
| 3,492,515 | 1/1970 | Foskett.......................... | 310/49 |

FOREIGN PATENTS

| 411,282 | 6/1934 | Great Britain................. | 310/82 |

*Primary Examiner*—D. F. Duggan
*Attorney*—Hurvitz and Rose

ABSTRACT: A step motor in which a pair of normally spaced cooperating gears having confronting surfaces adapted for frictional engagement are forced into such engagement along a limited region thereof by electrical energization of one or more coils of a symmetrical array of coils coupled to one of the gears, the coils being positioned to interact with the magnetic field produced within permanent magnet pole gaps equal in number to the number of coils.

PATENTED JUN 15 1971

INVENTOR
HAROLD R. NEWELL

BY Hurwitz, Rau & Greene

ATTORNEYS

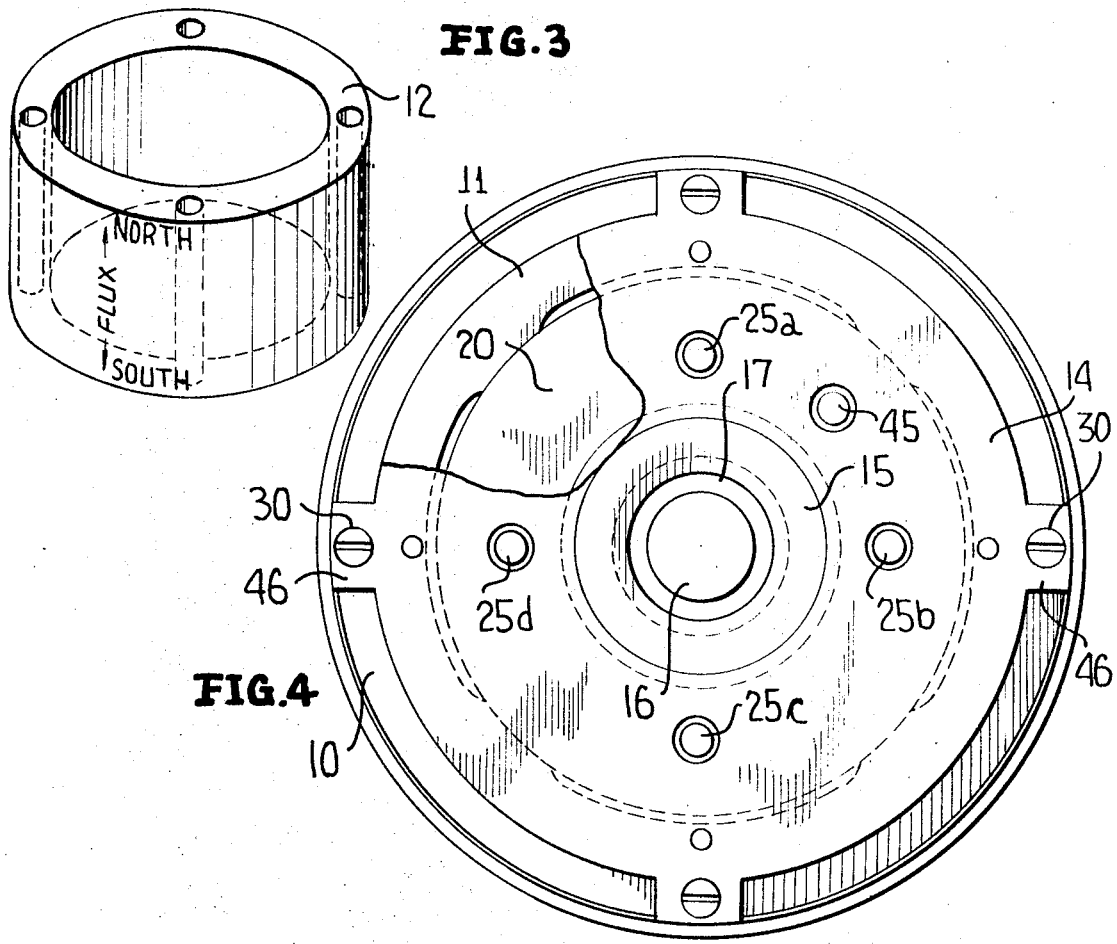
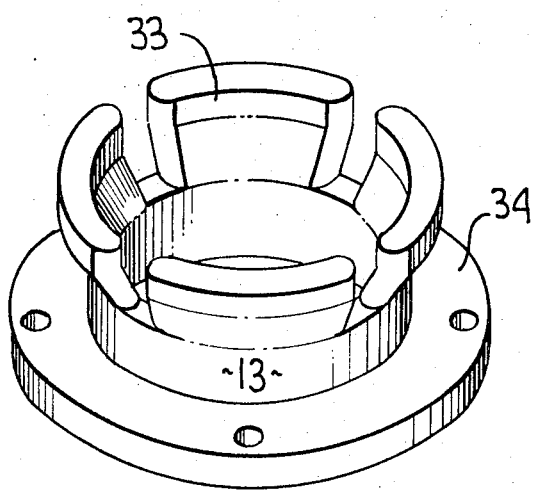

MOVING COIL STEP MOTOR

BACKGROUND OF THE INVENTION

The present invention relates generally to step motors, and more particularly, to step motors utilizing the principles of harmonic drive in conjunction with a wobbling disc.

In several of my prior patent applications, I have disclosed various forms of step motors in which a wobbling rotor undergoes little or no rotation relative to the housing in response to selected energization of a plurality of stator coils, but in which cooperating gears, one or more of which is located on the rotor, are effective to produce controlled, incremental rotational movement of the shaft. Specific reference is made, for example, to the following copending applications in which I am the sole inventor, and which are assigned to the same assignee as the present application: "Harmonic Drive for Digital Step Motor," Ser. No. 664,331, filed Aug. 30, 1967; "Wobble Drum Step Motor," Ser. No. 689,535, filed Dec. 11, 1967, now U.S. Pat. No. 3,456,139; and "Step Motor with Variable Tilt," Ser. No. 723,807, filed Apr. 24, 1968 and now U.S. Pat. No. 3,530,322.

In each instance, the disclosed embodiment includes an armature or rotor in the form of a magnetically permeable circular plate or disc which undergoes wobble motion in response to phase switchings according to energization of the field windings, and thereby produces sinusoidally varying position of mating contact between a ring gear on the rotor and a ring gear coupled to the motor shaft. That is, the region at which the gears intermesh propagates with substantially sinusoidal wave motion, the rotor operating in wobbling movement alone, or, if rotating, doing so at an extremely low rotatory rate.

While step motors of this type are admirably suited for their intended purpose and perform well in operation, they are characterized by the requirement of a rotor or wobble disc of appreciable mass, because the rotor is necessarily composed of magnetically permeable material of sufficient cross section to inhibit saturation in order to ensure the provision of adequate drive power. This leads to a relatively high mechanical time constant in that adequate force must be exerted on the rotor to overcome its considerable mass and thereby produce the wobble motion. Accordingly, there is some degradation of the step response of the motor.

To circumvent the need for a heavy permeable rotor and thus to improve the step response of the motor, I invented a rotor comprising a single movable coil wound on a plastic coil form having the shape of a disc. A step motor containing the last-mentioned type of rotor is the subject of my copending application for U.S. Pat. Ser. No. 721,364, entitled "Wobble Coil Stepping Motor," filed Apr. 15, 1968. According to the invention there disclosed, the wobble element comprises a coil of wire wound on a coil form attached to a disc of nonmagnetic and electrically nonconductive material. The disc supports a pair of ring gears of different diameters, one of which is adapted to mesh with a fixed gear fastened to the motor housing, and the other arranged to mesh with a gear coupled to the motor shaft. The wobble element or rotor is coupled to the shaft for wobbling thereabout and rotation relative thereto by a universal joint that permits axial freedom but no radial freedom of the rotor. The coil is energized to carry an electric current during motor operation, and the interaction between the magnetic flux surrounding the coil and the magnetic flux about the energized stator windings produces the desired wobbling.

By use of the principles of that invention, one obtains a step motor in which the rotor or disc is relatively lightweight, and thereby obtains an advantage in that the force required to produce the desired movement of the rotor is substantially reduced over previous designs. However, while a mechanical advantage is achieved, the current to the coil is maintained constant and the magnetic pole fields are switched, with the result that the electrical time constant is similar to that of previous designs.

It is a principal object of the present invention to provide improvements in wobbling disc stepper motors by incorporation therein of an improved moving coil rotor.

SUMMARY OF THE INVENTION

Briefly, according to a preferred embodiment of the present invention, a permanent magnetic field is provided at four or more pole gaps, and the rotor is utilized to support a like number of coils which are electrically excited to interact with the magnetic field in the pole gaps. The motor construction is otherwise quite similar to that of my earlier wobbling coil stepping motor.

Because the wobble disc need not be composed of heavy permeable material, and is in fact preferably formed from suitable plastic material, the mechanical time constant is reduced and the step response improved over motors having the permeable disc. Moreover, the current buildup in the moving coils is quite rapid, thereby reducing the electrical time constant and further improving the step response. Construction tolerances are eased because the coils move principally longitudinally in the pole gaps.

BRIEF DESCRIPTION OF THE DRAWINGS

The above and still further objects, features and attendant advantages of the present invention will become apparent from a consideration of the following detailed description of a preferred embodiment thereof especially when taken in conjunction with the accompanying drawings, in which:

FIG. 3 is a perspective view of the permanent magnet ring of the assembly of FIG. 2;

FIG. 4 is a plan view of the motor of FIG. 1 with the top cover removed and the upper housing member partly broken away;

FIG. 5 is a Table illustrating an exemplary switching sequence for the movable coils in the motor of FIG. 1; and FIG. 6 is a perspective view of one of the pole pieces employed in the permanent magnet assembly of FIG. 2.

DESCRIPTION OF THE PREFERRED EMBODIMENT

Figure 1:
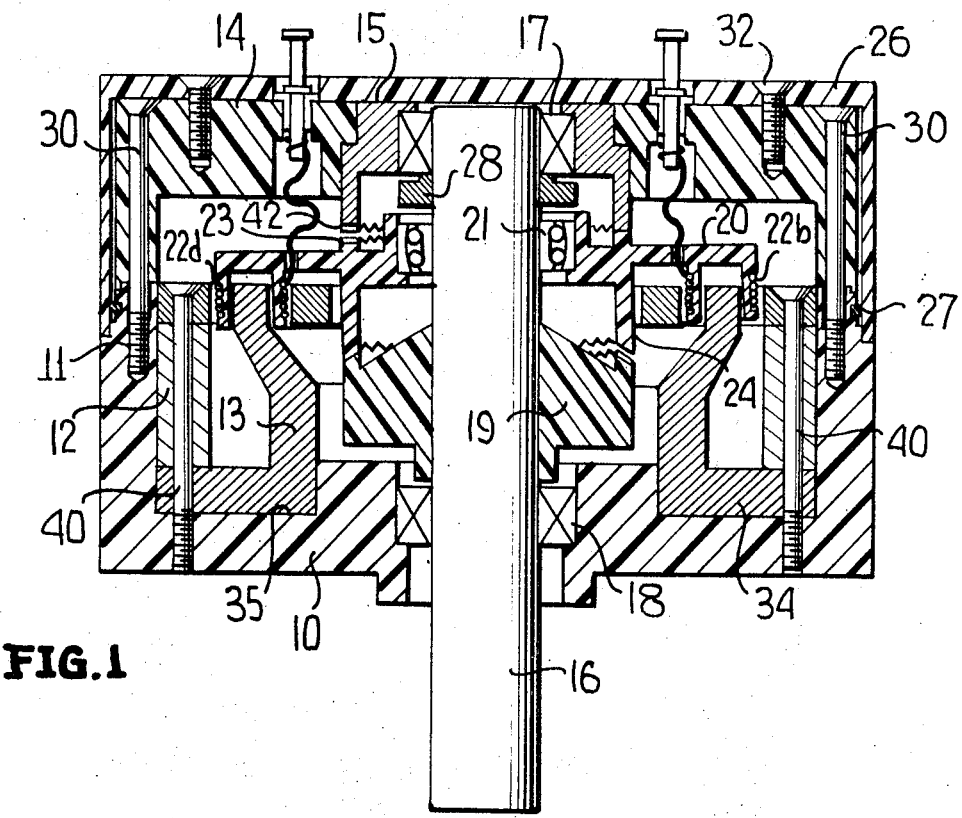
FIG. 1 is a sectional view of the motor taken along a plane containing its axis of symmetry.

Referring now to the drawings, the motor housing includes a pair of mating members 10, 14 which together form a hollow cylindrical configuration having a central axial hole extending through both end walls. Housing member 10, which is also referred to in the subsequent description as the lower housing member in contrast to upper housing member 14 strictly for their respective positions in FIG. 1, has a shoulder extending about its cylindrical outer surface. The shoulder is adapted to receive a housing cover 26 in abutting relationship therewith, the upper housing member 14 having a smaller outer diameter to prevent interference with the cover, whose diameter matches that of lower housing member 10.

An O-ring groove also extends circumferentially about the exterior cylindrical surface of housing member 10 above the shoulder and is dimensioned to receive an appropriate O-ring 27 which, together with cover 26 and a seal on a bearing 18 for motor shaft 16, renders the motor oiltight.

Shaft bearing 18 seats on a shoulder along the interior surface of lower housing member 10 forming the aforementioned central hole in that member.

The housing members 10, 14, which are fastened together by four or more screws 30, are composed of nonmagnetic material, as is cover 26. The cover is attached to upper housing member 14 by screws 32.

Positioned within lower housing member 10 is a magnetic assembly that includes an open cuplike member 13 (FIG. 6) whose sidewall is partly slotted to form four projections 33 and whose bottom wall turns outward (relative to the central axis) in the form of a flange 34; a permanent magnetic ring or annulus 12 having north and south poles as indicated in FIGS.

Figure 2:
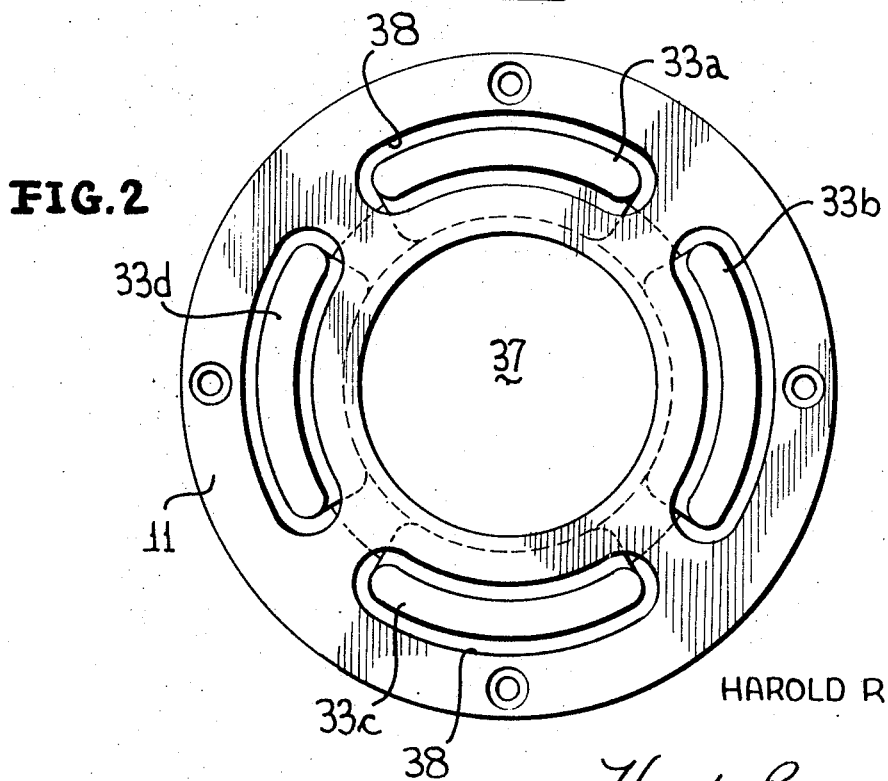
FIG. 2 is a plan view of the permanent magnet assembly employed in the motor of FIG. 1.

1 and 3, and a circular plate 11 having a central hole 37 and four arcuate slots 38 (FIGS. 1 and 2). Upon assembly of the several members and positioning component 13 within an annular groove or channel 35 in lower housing member 10, to which the assembly is fastened by four screws 40, plate 11 forms a pole piece for the north pole of permanent magnet 12 and member 13 forms the pole piece for the south pole. The four projections 33a, 33b, 33c, and 33d of member 13 are received within arcuate slots 38 of pole piece 11 and are spaced from the sides of the respective slots by a relatively uniform gap. Each gap is intended to receive an arcuate, approximately oval coil 22a, 22b, 22c, and 22d wound on respective coil forms of the rotor, of which more will be said presently. Pole pieces 11 and 13 are formed of magnetically permeable material so that magnetic flux lines bridge the gaps between projections 33 and the sides of slots 38.

Upper housing member 14 receives within its central shouldered hole a bearing cup or holder 15 for retaining a bearing 17. The rim 42 of holder 15 is provided with teeth or other surface capable of frictional engagement or intermeshing with a mating surface on rotor or wobble disc 20. A shaft 16 extends into the housing and is received within bearing 17. Ring 28 is fastened to shaft 16, as by a set screw (not shown), to prevent the shaft from "bottoming" against cover 26 and, in conjunction with a further gear 19 to be described presently, inhibits axial play in the shaft. A lower bearing 18 through which the shaft projects outwardly of the housing seats against the shouldered central aperture in lower housing member 10 and is maintained in that position by shaft gear 19. The latter is fastened and preferably keyed to shaft 16 by any suitable means (not shown).

A moving coil wobble disc or rotor 20 is mounted on shaft 16 by a spherical ball bearing or other accurate universal-type joint 21. For other universal joints, some form of axial freedom must be provided in a different manner, such as by permitting the joint to slide axially on the shaft. In any event, the coupling between shaft and disc should be such that the disc may wobble freely around the shaft and has some limited axial freedom, but is restrained radially and thereby held concentric with the shaft. Disc or rotor 20 is preferably composed of plastic or other lightweight nonmagnetic material and is provided with a pair of annular or ring gears 23 and 24 on opposite sides thereof positioned to mesh or mate with gears 42 and 19, respectively. Along the side of the disc from which gear 24 projects, but positioned outwardly thereof, are four generally oval, arcuate coil forms on which coils 22a, b, c, and d are wound. The coils and coil forms are positioned for entry within gaps associated with respectively lettered projections 33a, b, c, and d (FIG. 2).

Each coil is coupled via a lead to a respective terminal 25a—d (FIG. 4) projecting through the upper housing member 14 and cover 26, by which to supply current thereto. The end of each coil opposite that connected to a current input terminal is coupled to a common or reference potential point via a further single terminal 45 (FIG. 4).

In assembling the motor, the magnetic assembly is placed within and fastened to the lower housing member 10. Bearing 18 is then seated, and shaft 16, to which gear 19, bearing 21, and ring 28 are fastened, is inserted through the bearing until an edge of gear 19 prevents further axial movement. Disc 20 may be placed in appropriate position before or after placement of the shaft, depending upon desired arrangement of retention or capture of bearing 21. In the embodiment shown in FIG. 1, the disc is put in position first. Next, bearing 17 and bearing holder 15 are fitted in place, followed by insertion of terminals 25 and 45 through respective holes in upper housing member 14 and mating of the latter with lower housing member 10. Preferably, the upper housing member is not perfectly cylindrical, with respect to continuity of its curved wall, but is broken or interrupted to provide it with four legs 46 (FIG. 4) on which it is mounted to the lower housing member using screws 30. Such an arrangement permits access to the interior of the motor when cover 26 alone is removed. To complete the motor assembly, the cover is attached to the housing by screws 32 after terminals 25 and 45 have been pushed through appropriate holes therein. Finally, the terminals are clamped in position by suitable conventional snap retainers (not shown). Obviously, the terminals should be electrically insulated from any conductive parts with which they may come into contact, other than the wires or other electrical connectors.

In operation of the motor, current is preferably supplied to all four coils 22 at the same time, but such that current flows in two adjacent coils, say 22a and 22b, in the same direction while the other two coils, 22c and 22d, are energized to receive current in the opposite direction. Accordingly, with the permanent magnetic flux bridging the gaps between the two pole pieces (11 and 13) there is an interaction of magnetic fields that results in attraction of one side of the disc and repulsion of the other by the permanent magnetic assembly. As is most clearly indicated in FIG. 1, gears 19 and 24 are forced into engagement along a region between the moving coils that are attracted into the gap, and gears 23 and 42 are forced into engagement at a region along the diametrically opposite side of the rotor. Since the rotor is provided with limited axial freedom by virtue of the nature of the universal bearing 21, engagement of the gears along their respective regions of contact is complete, and no undesirable gear play (i.e., looseness of engagement or intermeshing) can be experienced.

Greater efficiency is obtained because all coils are "on" simultaneously to produce a push and pull reaction which provides a better force to inertia ratio than has been achieved with previous step motor designs. Of course, the use of only four coils results in a more abrupt (i.e., less smooth) transition between points of wobbling contact as the coils are energized in a predetermined sequence than would be the case for a greater number of coils. It should be quite clear that I do not wish to limit my invention to any particular number of coils, and that the embodiment disclosed herein represents an earnest effort to comply with the pertinent statutory provisions, without restricting the inventive principles and concepts. A suitable switching sequence for a single disc wobble cycle is set forth in FIG. 5, with the direction of the sequence dependent upon whether clockwise or counterclockwise rotation of the shaft is desired. Continuous wobble around of the rotor, and thereby, continuous stepped rotation of the shaft, requires of course that the switching sequence presented in FIG. 5 be repeated an appropriate number of times.

In practice it is desirable that the rotor actually not undergo rotation, but that it merely wobble about the axis in accordance with the "phase" switchings of the coils. For the disclosed embodiment, rotation of the rotor would not be possible because of the arrangement of discrete arcuate oval gaps for receiving the coils and of the fixed connections between coils and terminals. However, it is obviously a simple matter to provide a modified pole piece structure which would not restrict rotation of the rotor, and to provide sliding electrical connections to the coils. In any event, prevention of relative rotation between rotor disc and housing is implemented by proper selection of numbers of teeth on the gears fixedly attached to those two components. Clearly, if the same number of teeth is presented on each of gears 23 and 42 (for example, 90 teeth per gear), then no relative rotation of rotor versus housing is experienced as the rotor wobbles around on the longitudinal axis of the motor assembly. On the other hand, by providing gears 19 and 24 with different numbers of teeth, relative rotation between shaft and rotor is achieved with simple "wobble-around" of the latter. As an example, the provision of one more tooth on gear 24 than on gear 19, say 91 on the former and 90 on the latter, results in a 4° rotation of the shaft with each complete wobble-around of the rotor, in a direction opposite that of the wobble-around. Accordingly, a single phase switching of the motor (e.g., from step 1 to step 2 in FIG. 5) with the numbers of teeth suggested above causes a 1° rotation of the output shaft.

Although wobble disc or rotor 20 has been illustrated as being of one-piece construction, it may be composed of more than one material, if desired. As an example, the teeth may be composed of an appropriate material to promote good wear resistance and attached to a lightweight material whose resistance to wear is of lesser consideration, the latter supporting both the teeth and the coils. The coil forms may be composed of nonconductive material, although better heat removal characteristics are obtained with a conductive material, such as aluminum. If a metal is used, however, it should be slotted to prevent the coil form itself from acting as a shorted turn, a situation which would create severe power dissipation and reduce step capabilities.

Another variation of construction is the use of a rotor disc having a flexible central portion attached directly to the housing, in place of the universal bearing and coupling to the shaft. This would obviate the need for gears 23 and 42, since such an arrangement permits wobble but no rotation of the shaft without the use of those gears. Disadvantages of this variation reside in the loss of some of the electrical input power to flex the coupling medium, and in a shaft drive that is less stiff and is more susceptible to "ringing" and resonance.

One may include a fluid within the motor to help dissipate heat from the windings and to damp any "ringing" or mechanical oscillation when the motor stops. Further, it is possible to replace the permanent magnet poles with an electromagnet arrangement.

I claim:

1. A motion transmitting system comprising at least one pair of coaxial, normally spaced, cooperating gears having confronting surfaces adapted for frictional engagement,
   nonmagnetic means supporting one of said gears,
   a plurality of electrical coils coupled in symmetrical array to said nonmagnetic means,
   means for selectively supplying electrical current to each of said coils, and
   universal joint means for supporting said one gear for tilting and rotational movement relative to the axis of said gears,
   stationary magnetic means for producing an interaction with each electrically energized coil to selectively deflect said one gear into contact with the other gear to produce frictional engagement between said surfaces,
   said gears having different dimensions for said frictional surfaces to produce relative motion therebetween in response to continued deflection of said one gear into contact with said other gear.

2. The invention according to claim 1 wherein said coils are energized to produce frictional engagement along only a limited sector of both gears in any given instant of time.

3. The invention according to claim 1 wherein each of said surfaces include teeth, and wherein frictional engagement is achieved by meshing of said teeth, said different dimensions provided by different numbers of teeth on said gears.

4. The invention according to claim 3 wherein said magnetic means includes permanent magnet pole pieces forming pole gaps in which a magnetic field exists for interaction with each said energized coil.

5. The invention according to claim 4 wherein said nonmagnetic means comprises a rigid circular plate, said one gear fastened to a planar surface thereof; a shaft extending along said common axis and through said plate; said plate and said shaft coupled via said universal joint means, said other of said gears being secured to said shaft for rotation therewith and means preventing rotation of said one of said gears.

6. A step motor, comprising
   a shaft,
   a pair of cooperating gears having a common axis with said shaft and having confronting toothed surfaces with different numbers of teeth,
   a nonmagnetic rotor supporting one of said gears, and pivotally coupled to said shaft for tilting relative to said axis and for relative rotation with respect to said shaft,
   said shaft coupled to the other of said gears for common rotation therewith,
   a plurality of electrical coils mounted in symmetrical array on said rotor,
   magnetic means establishing a permanent magnetic field for interaction with the fields of electrically energized ones of said coils, and
   said magnetic means located adjacent and axially displaced from said rotor and coaxial with said array of electrical coils,
   means for selectively energizing said coils for pivoting said rotor angularly relative to the axis of said shaft to force said gears into mesh at restricted regions along said toothed surfaces as said rotor wobbles about said axis,
   the different numbers of teeth on said gears resulting in rotation of said other gear in response to wobbling of said rotor.

7. The invention according to claim 6 wherein all of said coils are energized simultaneously with different polarities of energization to produce a push-pull reaction on said rotor relative to said other gear.

8. The invention according to claim 6 wherein said rotor has a disc shape, said coils arranged in circular array adjacent the periphery of said disc.

9. The invention according to claim 8 wherein four of said coils are provided, and wherein all of said coils are energized simultaneously, two adjacent coils in one polarity and the remaining two adjacent coils in the other polarity in a preselected switching sequence.

10. The invention according to claim 6 wherein said magnetic means comprises
    a plurality of axially extending, magnetically permeable poles arrayed coaxially with said shaft,
    an annular permanent magnet coaxial with said shaft,
    first magnetically permeable means magnetically coupling the ends of said poles and one end of said permanent magnet remote from said gears, and
    second magnetically permeable means extending between said permanent magnet and said poles adjacent the other ends thereof and defining an air gap around each said pole,
    said coils being hollow and each being configured to be disposed about said other end of a different one of said poles in said air gaps.

11. The invention according to claim 10 wherein said means for selectively energizing comprises
    means for energizing two adjacent coils at one polarity and two diametrically opposed coils at the other polarity.

12. The invention according to claim 6 wherein said magnetic means comprises
    a plurality of axially extending magnetically permeable poles arrayed coaxially with said shaft,
    means for magnetizing said poles so that adjacent ends thereof are of the same polarity,
    said coils being hollow and configured so that each coil surrounds one end of a different one of said poles.

13. The invention according to claim 12 wherein said means for magnetizing comprises a closed magnetic circuit defining an air gap around said one end of each of said poles.